(12) United States Patent
McKown

(10) Patent No.: US 6,429,854 B1
(45) Date of Patent: Aug. 6, 2002

(54) STEALTHY KEYBOARD

(76) Inventor: John W. McKown, 7619 N. Via Del Elemental, Scottsdale, AZ (US) 85258-3563

( * ) Notice: Subject to any disclaimer, the term of this patent is extended or adjusted under 35 U.S.C. 154(b) by 84 days.

(21) Appl. No.: 09/604,822

(22) Filed: Jun. 28, 2000

(51) Int. Cl.[7] .................................................. G09G 5/00
(52) U.S. Cl. ....................... 345/168; 345/156; 345/161; 345/169; 345/184; 341/21; 341/22; 341/23; 200/5 R
(58) Field of Search ................................. 345/156, 157, 345/160, 161, 163, 169, 168, 173, 179, 184; 341/21, 22, 23, 176; 400/100, 485, 486, 489; 200/5 R, 5 A, 5 B, 5 C, 5 D

(56) References Cited

U.S. PATENT DOCUMENTS

| | | | |
|---|---|---|---|
| 4,042,777 A | | 8/1977 | Bequaert et al. |
| 4,344,069 A | * | 8/1982 | Prame ....................... 178/17 C |
| 4,680,572 A | * | 7/1987 | Meguire et al. ............... 341/24 |
| 4,791,408 A | * | 12/1988 | Heusinkveld ............... 400/479 |
| 4,905,001 A | | 2/1990 | Penner |
| 5,087,910 A | * | 2/1992 | Guyot-Sionnest ............ 341/22 |
| 5,189,416 A | * | 2/1993 | Estes ............................ 341/22 |
| 5,267,181 A | * | 11/1993 | George ........................ 708/142 |
| 5,361,083 A | | 11/1994 | Pollack |
| 5,432,510 A | * | 7/1995 | Matthews ..................... 341/20 |
| 5,473,346 A | | 12/1995 | Pollack |
| 5,515,305 A | * | 5/1996 | Register et al. ............. 400/486 |
| 5,745,056 A | | 4/1998 | Takahashi et al. |
| 5,889,507 A | * | 3/1999 | Engle et al. ................. 345/161 |
| 6,069,552 A | * | 5/2000 | Van Zeeland ............... 200/512 |
| 6,232,956 B1 | * | 5/2001 | Mailman ...................... 341/21 |

* cited by examiner

*Primary Examiner*—Richard Hjerpe
*Assistant Examiner*—Henry N. Tran

(57) ABSTRACT

A stealthy, one-hand keyboard suitable for pedestrians is implemented as a frame held between thumb and palm, to which is attached an adjustable array of keyswitches. The configuration is such that the fingers play no part in supporting the keyboard against gravity, nor in retaining it within the hand. This property facilitates faster typing. The keyboard is strapless and leaves the fingers near their relaxed positions. The hand hides the keyboard on one side and chords are entered by small motions of the fingers, actuating contact being via the flesh on the palm sides of the middle and distal phalanges. These properties reduce the keyboard's observability.

4 Claims, 12 Drawing Sheets

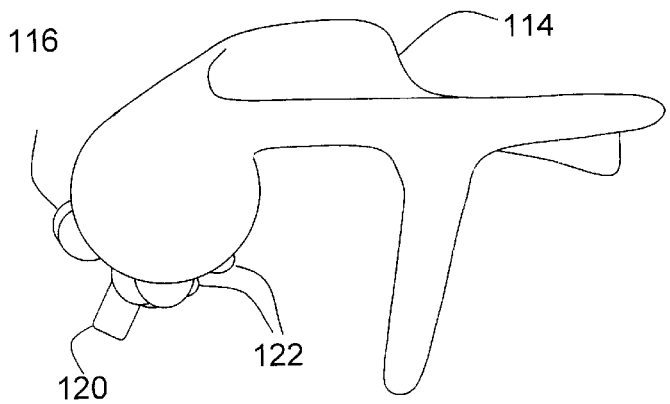
FIG. 15
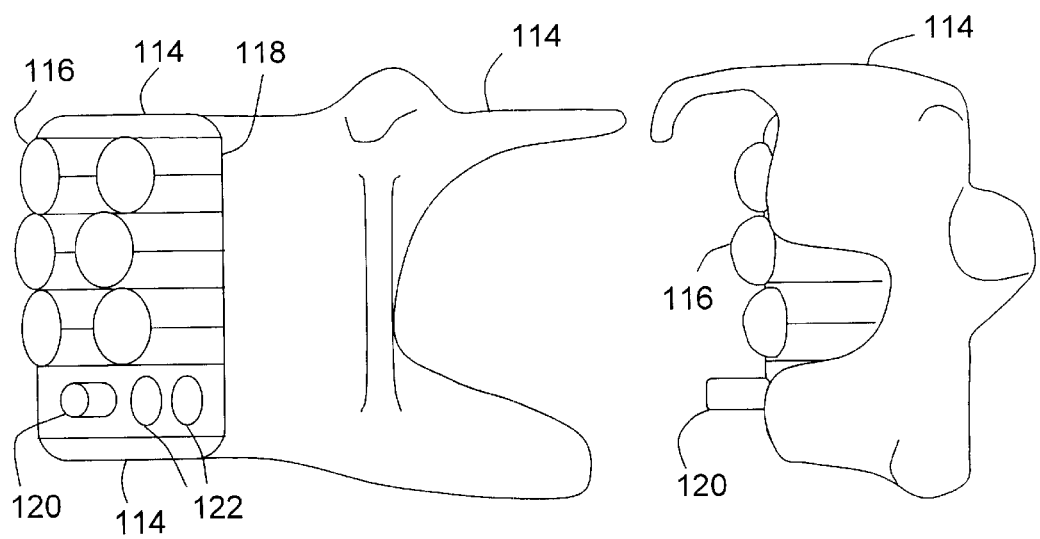 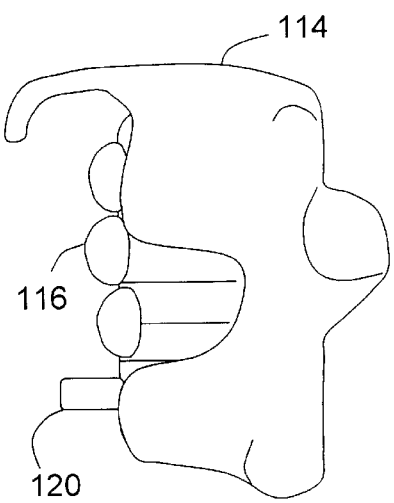
FIG. 16          FIG. 17

RING FINGER = 00

| MIDDLE FINGER | | INDEX FINGER | | | |
|---|---|---|---|---|---|
| | | 00 | 01 | 10 | 11 |
| | 00 | | SPACE | BACK SPACE | SHIFT |
| | 01 | E | I | N | C |
| | 10 | T | O | S | F |
| | 11 | R | M | W | Q |

RING FINGER = 01

| MIDDLE FINGER | | INDEX FINGER | | | |
|---|---|---|---|---|---|
| | | 00 | 01 | 10 | 11 |
| | 00 | A | H | D | Y |
| | 01 | L | P | B | J |
| | 10 | U | G | V | X |
| | 11 | K | Z | keybd | TAB |

RING FINGER = 10

| MIDDLE FINGER | | INDEX FINGER | | | |
|---|---|---|---|---|---|
| | | 00 | 01 | 10 | 11 |
| | 00 | < , | > . | : ; | " ` |
| | 01 | { [ | } ] | \| \ | ? / |
| | 10 | ! 1 | @ 2 | # 3 | $ 4 |
| | 11 | % 5 | ^ 6 | & 7 | * 8 |

RING FINGER = 11

| MIDDLE FINGER | | INDEX FINGER | | | |
|---|---|---|---|---|---|
| | | 00 | 01 | 10 | 11 |
| | 00 | ( 9 | ) 0 | — - | + = |
| | 01 | ENTER | ~ ` | ALT | CNTRL |
| | 10 | LEFT | RIGHT | UP | DOWN |
| | 11 | PAGE UP | PAGE DOWN | INSRT | DEL |

© 2000 JOHN W. MCKOWN

FIG.19

STEALTHY KEYBOARD

CROSS REFERENCE TO RELATED APPLICATIONS

Not applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of Invention

This invention relates to computer keyboards, specifically to improvements in one-hand, chording keyboards that are held by the operating hand.

2. Copyright Authorization

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise reserves all copyright rights whatsoever.

BACKGROUND

The need for a better, more portable computer keyboard is long-standing and growing more acute. It is widely expected that the current generation of laptop computers will be replaced in the future by so-called wearable computers which provide all the functionality of today's desktop units. Inherent in the concept of wearable computers is that they will be highly useable while the wearer is standing or even walking, much as is a cellular telephone.

The wearable computers currently available (e.g., those available from Xybernaut Corp., Fairfax, Va.) are obtrusive and are acceptable in only a very restricted range of social situations. However, if the components shrink sufficiently, wearable computers might in the future be more often thought of as unobtrusive personal effects like eyeglasses or a pocketknife and thus become more generally acceptable. Clearly, many new applications are enabled as the computer's components become less noticeable in use.

Data output devices suitable for use with wearable computers, i.e., devices usable by pedestrians in motion, are well known. They include non-immersive, head-mounted virtual displays (an example is described by The MicroOptical Corporation, Westwood, Massachusetts), light and sound alarms, tactile vibrators, etc. Non-immersive in this context means that the surrounding real world is not blocked out, typically because the virtual display subtends only a small fraction of the field of view or because it is semi-transparent or both.

However, the data input methods currently envisaged for wearable computers are problematic. Voice recognition technology can be used to navigate menus but remains computationally burdensome and unreliable for general text entry. More fundamentally, speaking the data aloud is often inappropriate, poses a security risk and can certainly be obtrusive. So-called pen computers and PDA's (Personal Digital Appliances) require use of both hands or a supporting table; the situation is similar regarding tiny QWERTY (i.e., conventionally layed out) keyboards designed for one-finger typing and chording keyboards designed for desk-top use.

Perhaps the best candidate devices for general text entry are one-handed chording keyboards that are designed to be held by the operating hand and thus do not require support by a table or lap. However, no keyboard described in the prior art simultaneously embodies all the characteristics necessary to enable practical, discrete entry of general text by pedestrians in motion, namely (a) the keyboard must be supported and operated by only one hand;

(b) it must be discretely and rapidly stowed and retrieved, preferably to and from a pocket of the user's clothing and preferably using only the operating hand;

(c) it must support touch typing, i.e., it must not require observation in use;

(d) it must support typing speeds comparable to those commonly achieved on QWERTY boards;

(e) it must allow integration of a computer mouse or equivalent, such as a miniature trackball or joystick;

(f) it must be learned reasonably easily;

(g) it must be small and stealthy in use and while stowed, i.e., it should not be immediately evident to a casual observer;

(h) it must operate in the same way and more or less equally well regardless of the orientations of the wrist and arm, so that the user is free to adopt whatever posture is appropriate to his circumstance and, (i) in use, it must leave the fingers near their relaxed positions, neither too curled nor too straight, so that the keyboard may be operated for long intervals without undue fatigue.

For example, Penner (U.S. Pat. No. 4,905,001) describes strapping a one-handed keyboard to the palm or building the switches into the joints of a glove-like device. A strap across the back of the hand is also used by the "Twiddler," which is available from Handykey Corp. (Mt. Sinai, N.Y.). These designs do not have properties (b) and (g) above. The Twiddler also requires that the fingers curl tightly, pointing back at the palm, which violates (i) above.

Penner and others (e.g., Pollack in U.S. Pat. Nos. 5,361,083 and 5,473,346) describe also strapless configurations in which the keying fingers support the keyboard against gravity and retain it within the hand.

Surprisingly, trials and experimentation establish that it is very difficult to type with any speed when the keying fingers must also support the keyboard or assist in retaining it within the hand. The reason is that as the different chords are keyed the supporting forces and application points must be adjusted constantly to avoid pressing unwanted keys or dropping the unit. This requires much more skill than typing on a keyboard supported independently of the typing fingers (e.g., a conventional, table-supported, QWERTY board). In reality, keyboards supported by the keying fingers seriously violate (f) above. Less surprisingly, it also proves very desirable in practice to be able to flex, stretch and wiggle the typing fingers without dropping the keyboard.

Takahashi et al. (U.S. Pat. 5,745,056) describe a keyboard held by a single hand via the thumb and a "palm rest," independently of the keying fingers, but still show the keying fingers moving back and forth over a flat keyboard. This motion and the searching it implies slow both ultimate typing speed and skill acquisition rate. The design is visible from all sides of the hand and is in no way stealthy. It also requires highly curved finger positions.

There is thus a heretofore-unmet need for a one-handed, strapless keyboard, with lowered observability, which is not supported by the keying fingers and which leaves the fingers always near their rest positions. Such a keyboard would have applications beyond wearable computers and could be used advantageously with existing computers and appliances that have embedded computers. It is often useful to have one hand free or not to necessarily sit at a table or with a QWERTY board balanced on one's lap.

Another limitation of the prior art is that it does not well address variation in finger dimensions between users. This variation is not important for conventional QWERTY boards because wrongly placed keys are compensated by moving the entire hand relative to the keyboard, stroke by stroke. Keyboards that are supported by the operating hand do not have this degree of freedom. The obvious solution is to manufacture such keyboards in a range of standard sizes, as is done for gloves, but this increases inventory and complicates logistics.

SUMMARY OF THE INVENTION

In accordance with the present invention, a one-handed, chording, computer keyboard comprises a frame held between the thumb and palm, with an attached array of keyswitches. The configuration is such that while the keyboard is in use the hand approximates a relaxed, empty position with the fingers slightly bent. The hand hides the keyboard from observers at viewpoints off the back (dorsal) side of the hand. The keyswitches are typically arrayed in pairs with actuating contact being via the flesh on the palm sides of the middle and distal phalanges. Importantly, the keying fingers do not support the keyboard.

In one embodiment the frame provides sufficient space for a miniature joystick, such as is available from InControl Solutions, Inc. (Portland, Oreg.), or other positioning device, and any necessary electronics.

In a further embodiment, the positioning device replaces one or more of the keyswitches.

The keyswitches generate input signals for a microprocessor which communicates with a keyboard port (e.g., serial, PS/2 or USB) through wires or through a wireless link.

It is an object of the present invention to provide a compact, discrete computer data entry method suitable for general text and control character inputs to both wearable and nonwearable computers.

An advantage of the present invention is that it provides low observability when stowed and when in use.

A further advantage is that it allows faster typing because it frees the keying fingers from any need to support the keyboard against gravity, or to retain it within the hand, or to search out the location of desired keys.

A still further advantage is that it may be adjusted to fit individual fingers.

BRIEF DESCRIPTION OF THE DRAWINGS

FIGS. 15–17 are orthogonal views of an alternative embodiment with disk-shaped spacer arms.

FIG. 19 defines the preferred mapping from chords to characters.

DETAILED DESCRIPTION OF THE INVENTION

The preferred embodiment utilizes ordinary, normally open, single pole, single throw, momentary-contact keyswitches, which are switches actuated by keys, for their low cost. Many similar keyswitches are available commercially so they are depicted here generically, without unnecessary detail. In particular, the switch terminals and connecting wires are not shown. FIGS. 6–12 and FIGS. 14–18 all show left-handed embodiments but it is understood that right-handed embodiments are included within the principles of the present invention.

Figure 1:
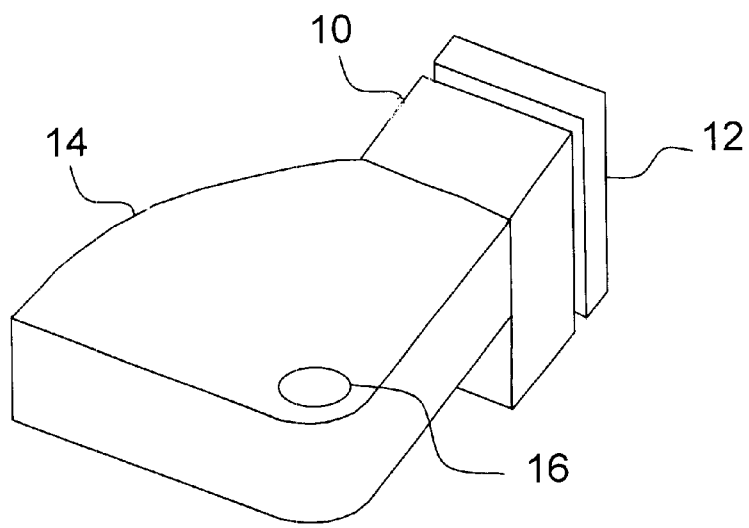
FIG. 1 illustrates a keyswitch asymmetrically attached to a spacer arm.

FIG. 1 shows a keyswitch comprising switch 10 and key 12 securely attached to the broad end of a wedge-shaped spacer arm 14 at the other, more pointed end of which is a hole 16 for a shaft. The keyswitch is offset from the center plane of the spacer arm such that a pair of spacer arms can be placed adjacently on a shaft with both their keys aligned to the same position along the shaft.

Figure 2:
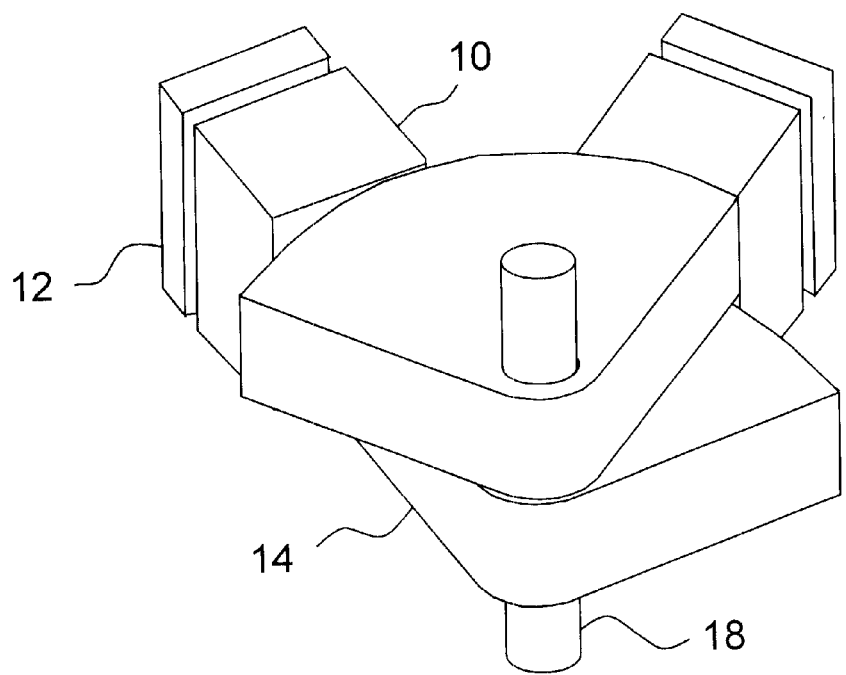
FIG. 2 shows a pair of spacer arms with attached keyswitches mounted on a shaft, oriented back to back so that their keyswitches are paired at the same position along the shaft.

FIG. 2 shows a pair of spacer arms so placed on a short shaft 18. The positions of the paired keyswitches and their separation can be varied by turning the spacer arms independently on the shaft.

Figure 3:
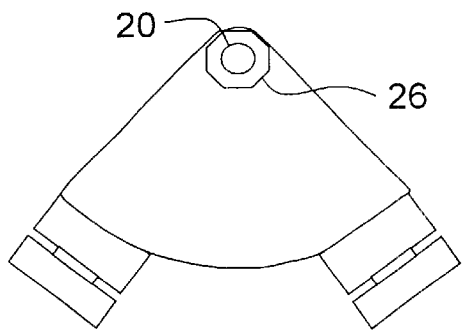
FIGS. 3, 4 and 5 are orthogonal views of eight keyswitches stacked on a shaft.
Figure 4:
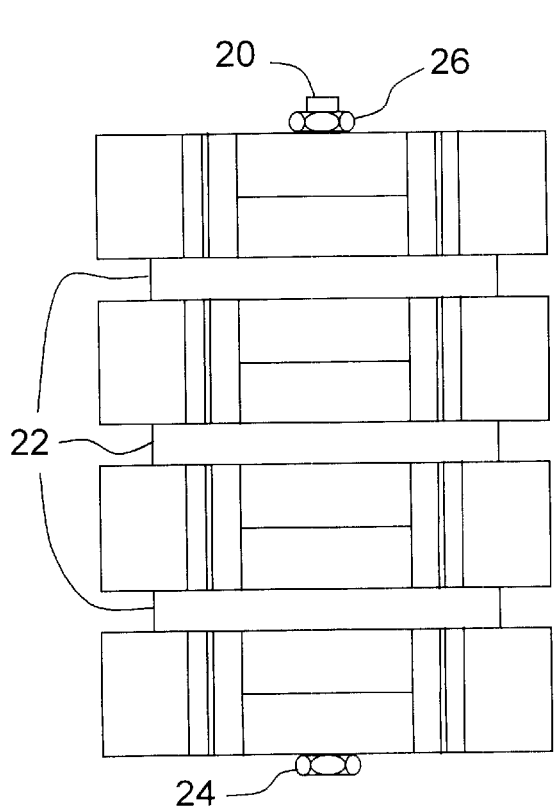
Figure 5:
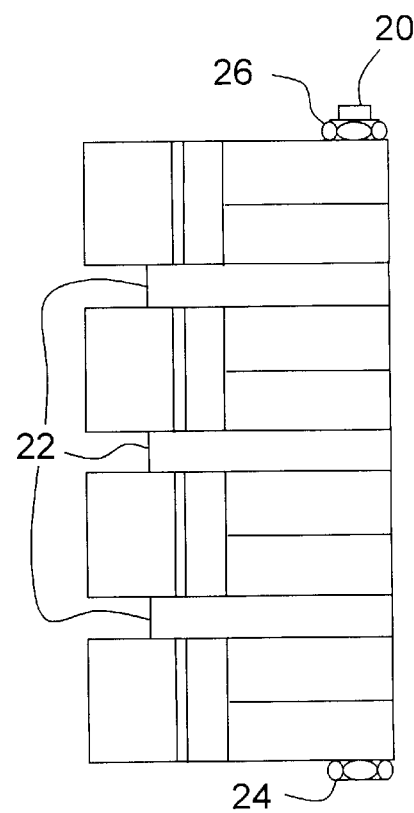

FIGS. 3–5 are orthogonal views of four stacked pairs of these spacer arms with keyswitches on a single, longer shaft 20, with optional, keyswitchless spacers 22. This keyswitch stack can be custom fit to an individual hand by turning the spacer arms on the shaft. Conducting wires, either dressed down the side of the stack or run through interior channels, will generally be necessary to connect the keyswitches to supporting circuitry but for simplicity are omitted in the figures.

Means, such as a head 24 on one end of the shaft and a threaded nut 26 on the other end to squeeze the stack, are provided to prevent relative motion of the spacer arms once they have been set in their desired positions. Many other suitable methods for controlling the motion of the spacer arms are well known.

Figure 6:
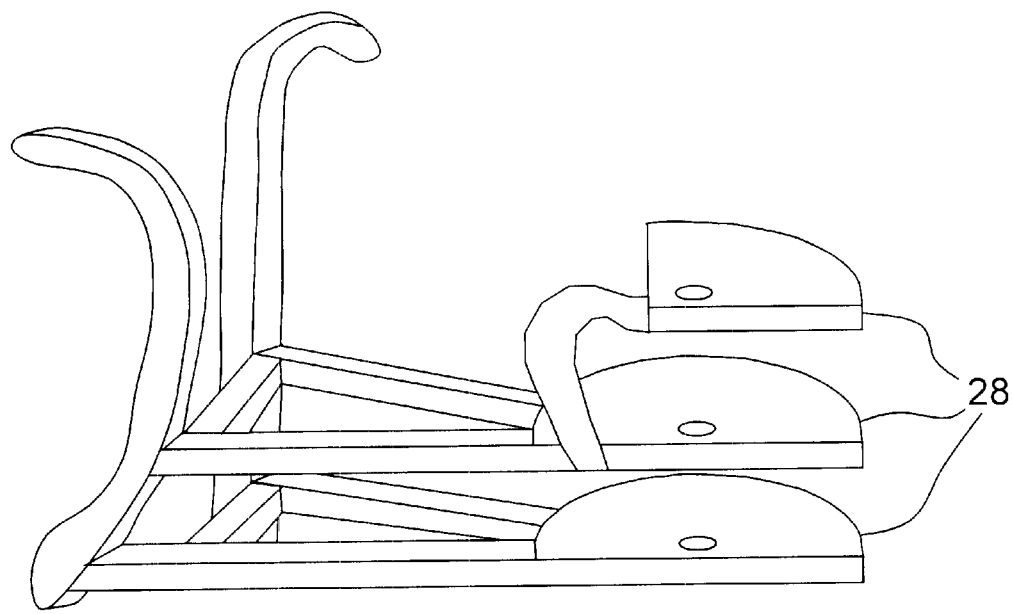
FIG. 6 is a rigid, grippable frame.

FIG. 6 is a perspective view of a rigid frame that may be gripped between the thumb and palm. Elements of the frame 28 replace the keyless spacer arms 22 of FIG. 5 and the shaft passes through them to join the frame and stack firmly.

Figure 7:
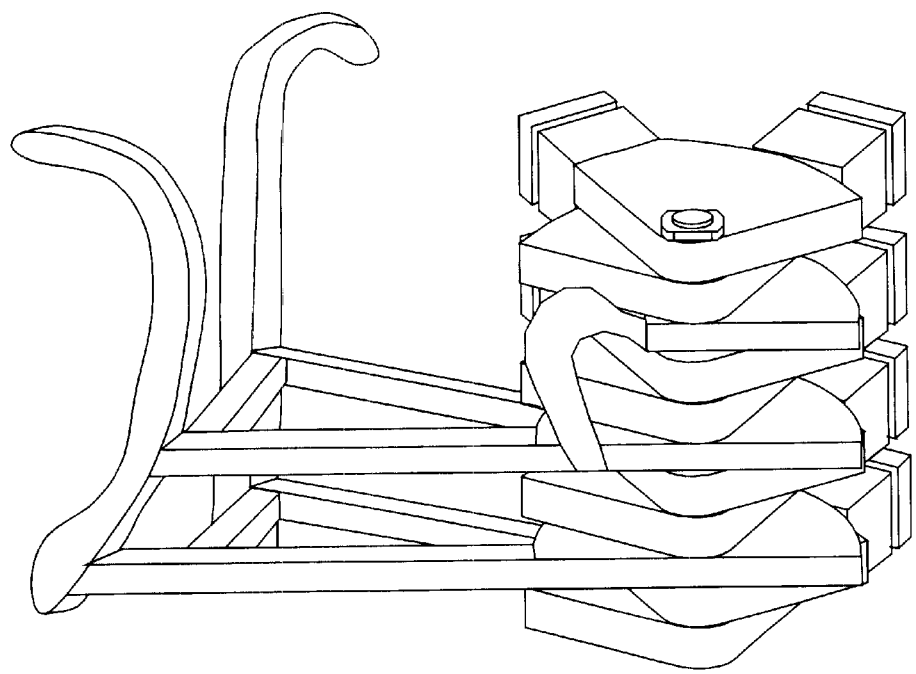
FIG. 7 is a keyswitch stack mounted on the frame of FIG. 6.

FIG. 7 is a perspective view of a stack of keyswitches joined to the grippable frame of FIG. 6.

Figure 8:
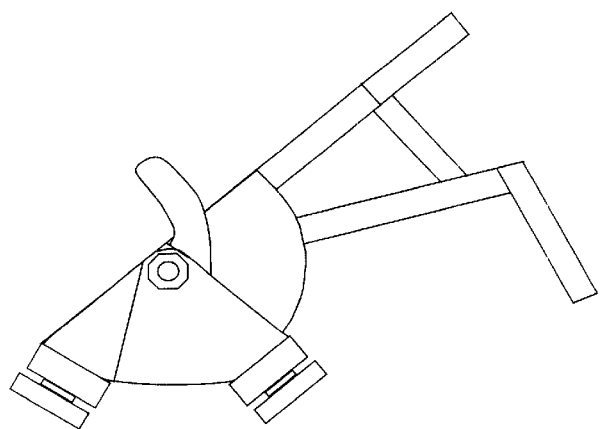
FIGS. 8, 9 and 10 are orthogonal views of the keyswitches and frame of FIG. 7.
Figure 9:
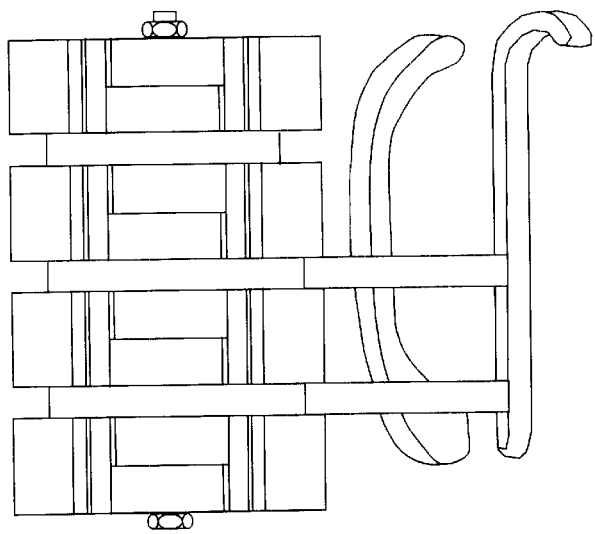
Figure 10:
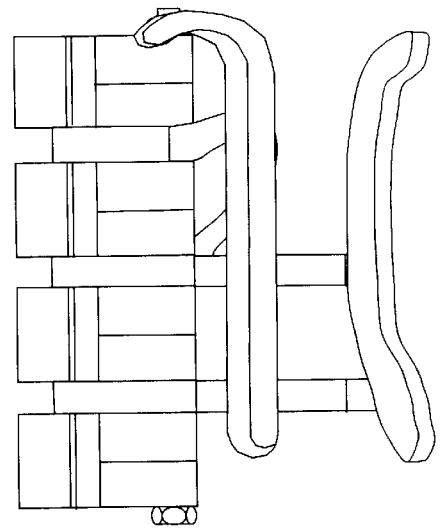

FIGS. 8–10 are three orthogonal views of the stack and frame of FIG. 7.

Figure 11:
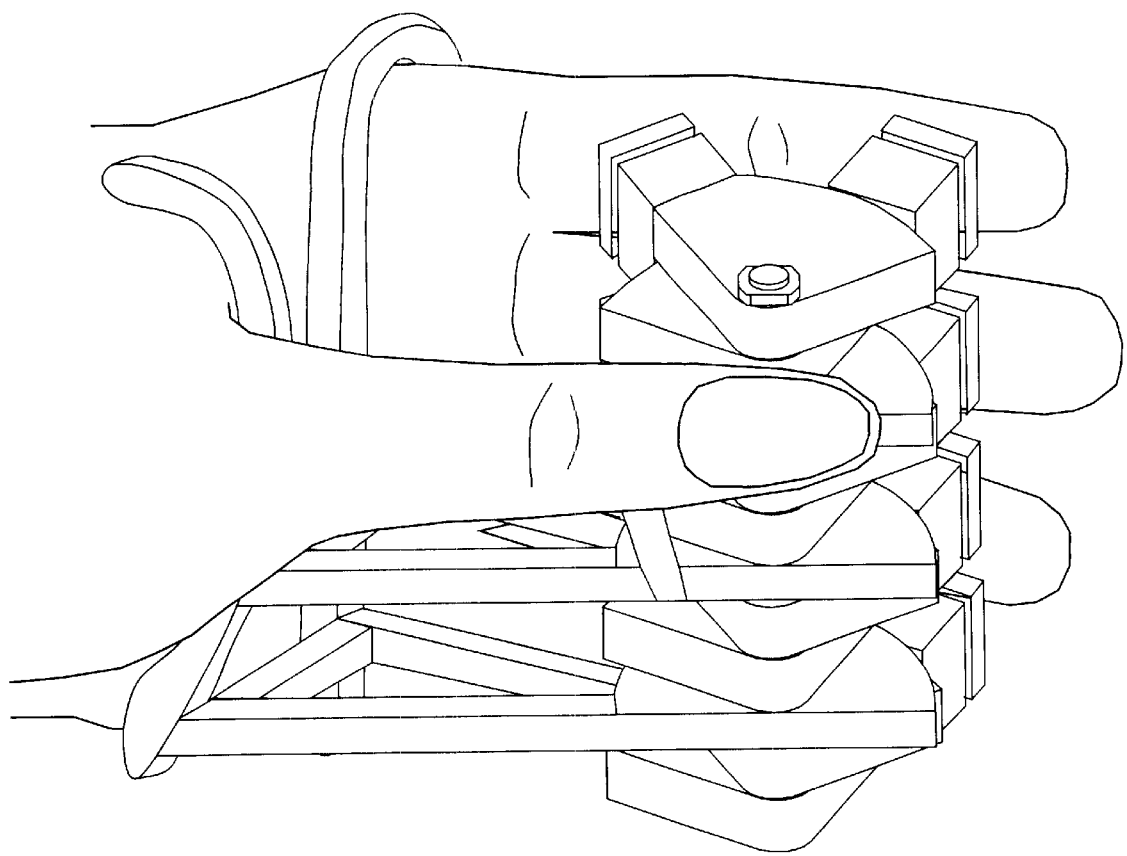
FIG. 11 shows how the frame is gripped between the thumb and palm of the left hand, leaving the fingers free to work the stacked keyswitches without supporting them.

FIG. 11 shows how the frame is gripped between the thumb and palm, leaving the fingers free to work the stacked keyswitches without supporting them.

Figure 12:
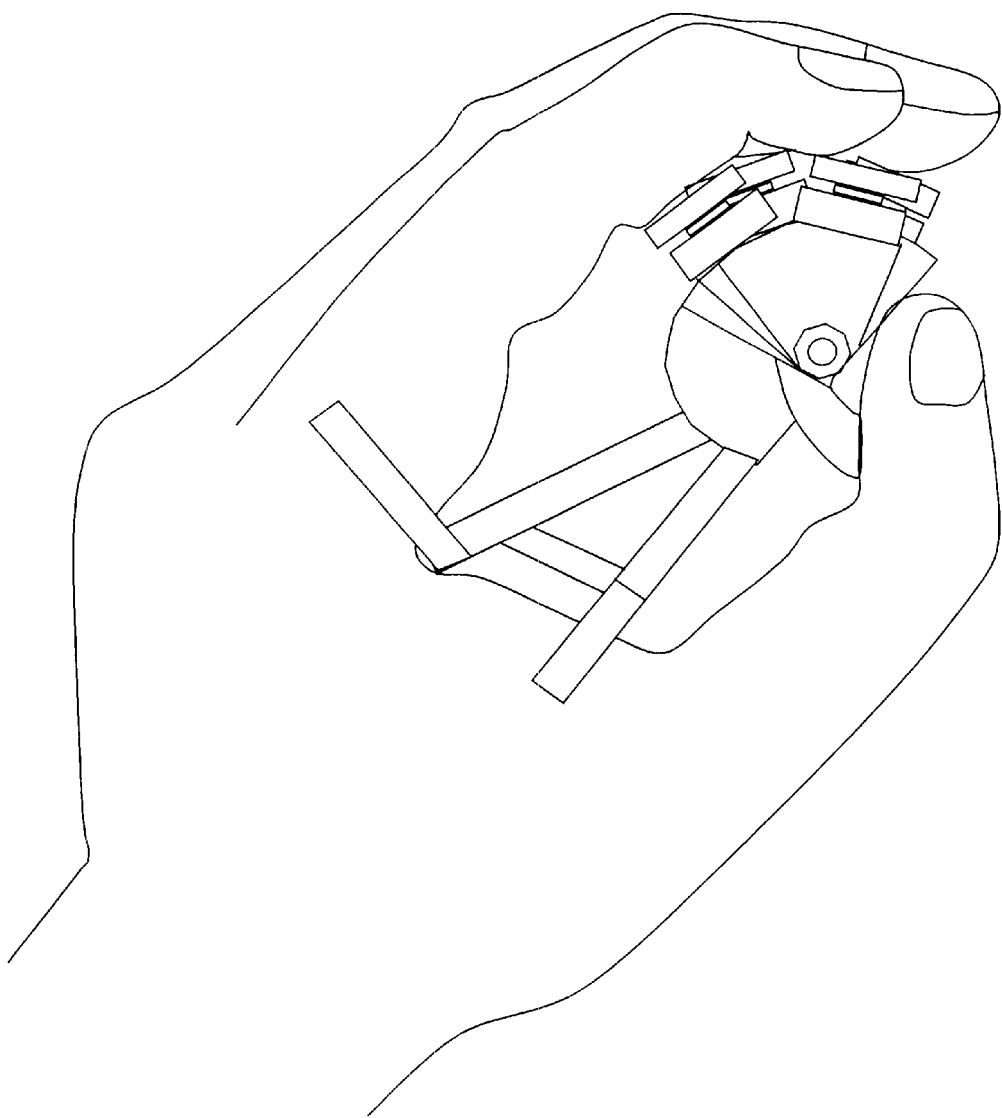
FIG. 12 shows the left hand and keyboard of FIG. 11 viewed from above.

FIG. 12 is a top view of the hand and keyboard of FIG. 11.

The keyboard of FIGS. 7–12 has a simple strut frame and is thus simple to manufacture from inexpensive plastics.

It is contemplated that in other embodiments some of the keyswitches in the stack might usefully be omitted. In particular, either of the keyswitches operated by the little finger might be omitted to make room for a miniature joystick or equivalent positioning device. It is further contemplated that the switches might be stacked such that some are not paired to share a position along the length of the shaft. It is also contemplated that automatic or manual means may be provided to inactivate the keyboard when it is not properly gripped for use.

Figure 13:
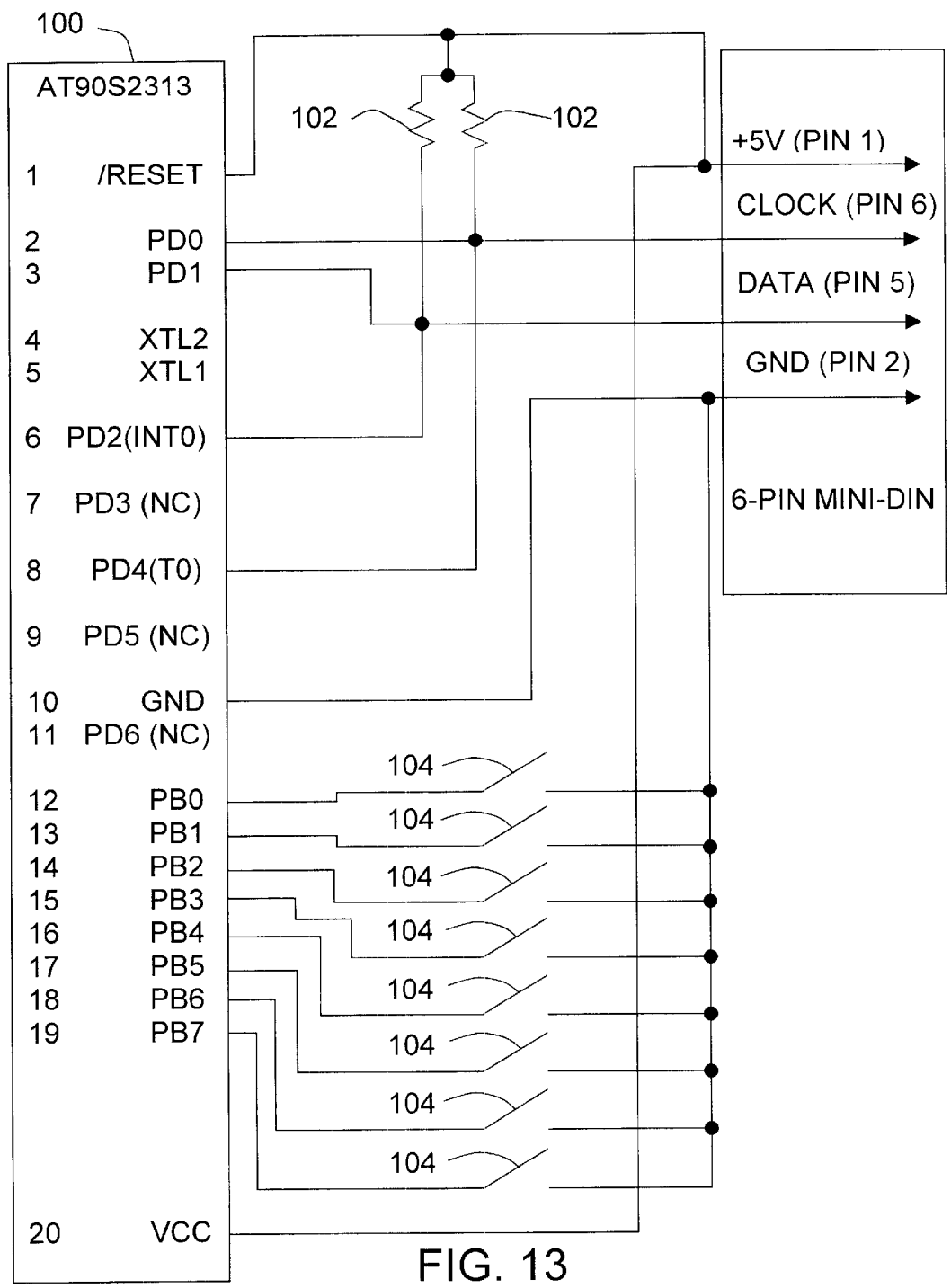
FIG. 13 is a schematic diagram of the keyswitches and a microprocessor.

FIG. 13 is a schematic diagram of circuitry to connect the present keyboard to a standard computer keyboard port, e.g., a PS/2 port such as is currently found on a majority of personal computers. This routine circuitry employs a microprocessor 100 and pull-up resistors 102 to emulate a standard QWERTY keyboard by translating the openings and closings of the keyswitches 104 into signals appropriate to the host's keyboard port signaling protocol. A firmware program suitable for the microprocessor is listed in the Appendix.

Figure 14:
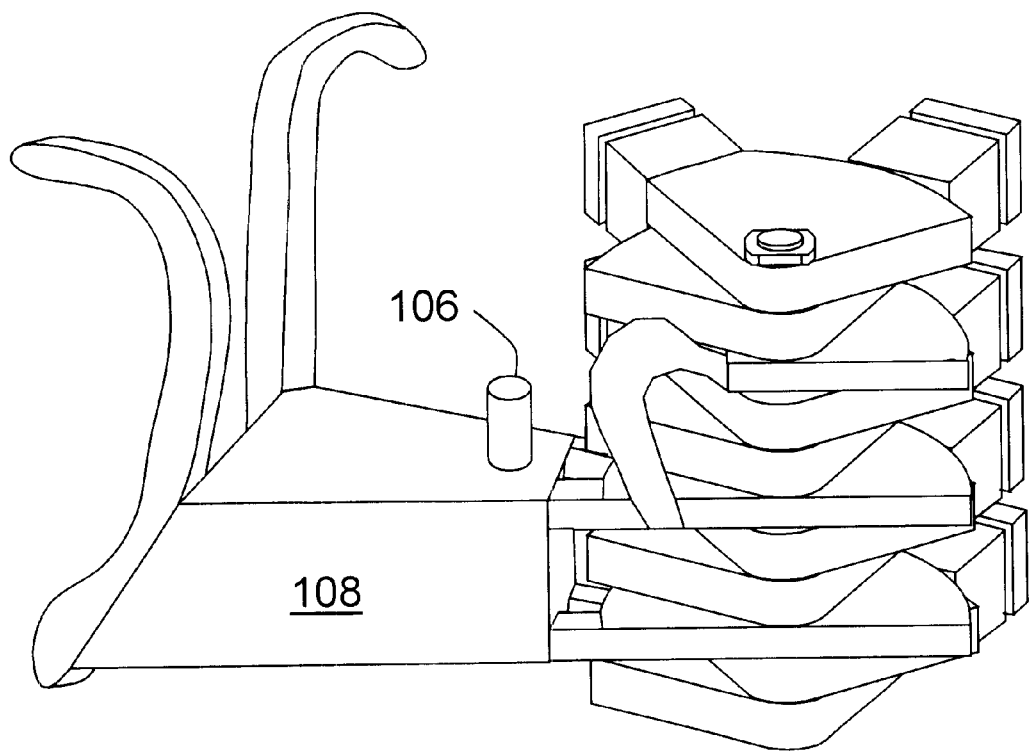
FIG. 14 illustrates an alternative embodiment with integrated joystick.

FIG. 14 shows an advantageous placement of a miniature joystick 106 where it can be easily worked by the thumb. FIG. 14 also shows an interior space of the frame enclosed by walls 108. This enclosed space is suitable to house the joystick circuitry, the keyboard circuitry of FIG. 13 and other circuitry such as a wireless transmitter and receiver which may replace the cord (not shown) which would otherwise connect the keyboard to a host computer (not shown). It is contemplated that such interior spaces may even house the host computer.

FIGS. 15–17 are three orthogonal views of an alternative keyboard embodiment in which the frame 114 and keys 116 are more rounded, the spacer arms 118 comprise disks instead of wedges and a miniature joystick 120 and mouse buttons 122 replace the little finger's keyswitches. The frame, spacer arms and keyswitches of FIGS. 15–17 may be constructed using strong materials such as polycarbonate plastics and manufacturing techniques typically employed for the cases of cellular telephones and pagers.

Figure 18:
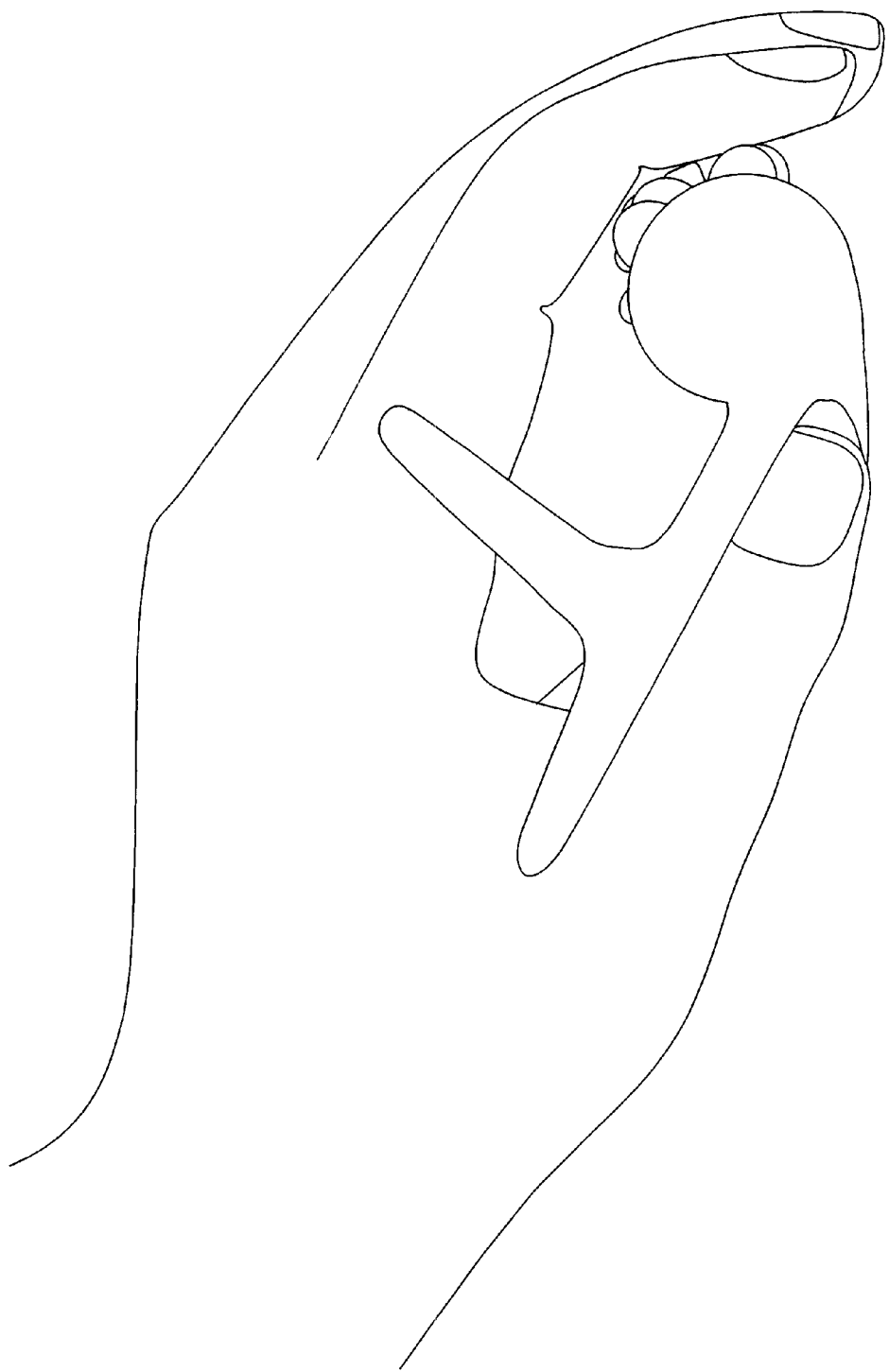
FIG. 18 is similar to FIG. 11 but applies to the alternative embodiment of FIGS. 15–17 rather than the embodiment of FIGS. 8–11.

FIG. 18 shows how the keyboard of FIGS. 15–17 is gripped by the left hand. It is contemplated that the alternative embodiment of FIGS. 15–18 and other embodiments may house any necessary electronic circuitry within the plastic frame or keyswitch stack, including a host computer and its peripheral devices.

FIG. 19 shows the preferred correspondence between chords and characters input to the host computer. FIG. 19 may be understood as follows. Let a pressed key represent a one and an unpressed key a zero. Let the key operated by the middle phalanx of the index finger represent the less significant bit (LSB) and the key operated by the distal phalanx of the same finger the more significant bit of the binary numbers 00, 01, 10 and 11 or, in decimal form, 0,1,2 and 3. Then each of these four possible states of the two switches operated by the index finger uniquely identifies a column in a four-by-four array of characters. In the same way, the middle finger identifies a row, the ring finger identifies one in a set of four such square arrays and the little finger identifies one of four such sets. Thus each of the 256 cells in four sets of four arrays, each array being four by four, has a unique address and corresponding chord. The preferred correspondence between those chords that do not require the little finger to press keys and the characters of a personal computer keyboard is defined by FIG. 19, with the further understanding that chording the upper of two characters in a single array cell requires a preceding SHIFT to make a two-chord sequence. The table of FIG. 19 is implemented by the program listed in the Appendix.

Figure 20:
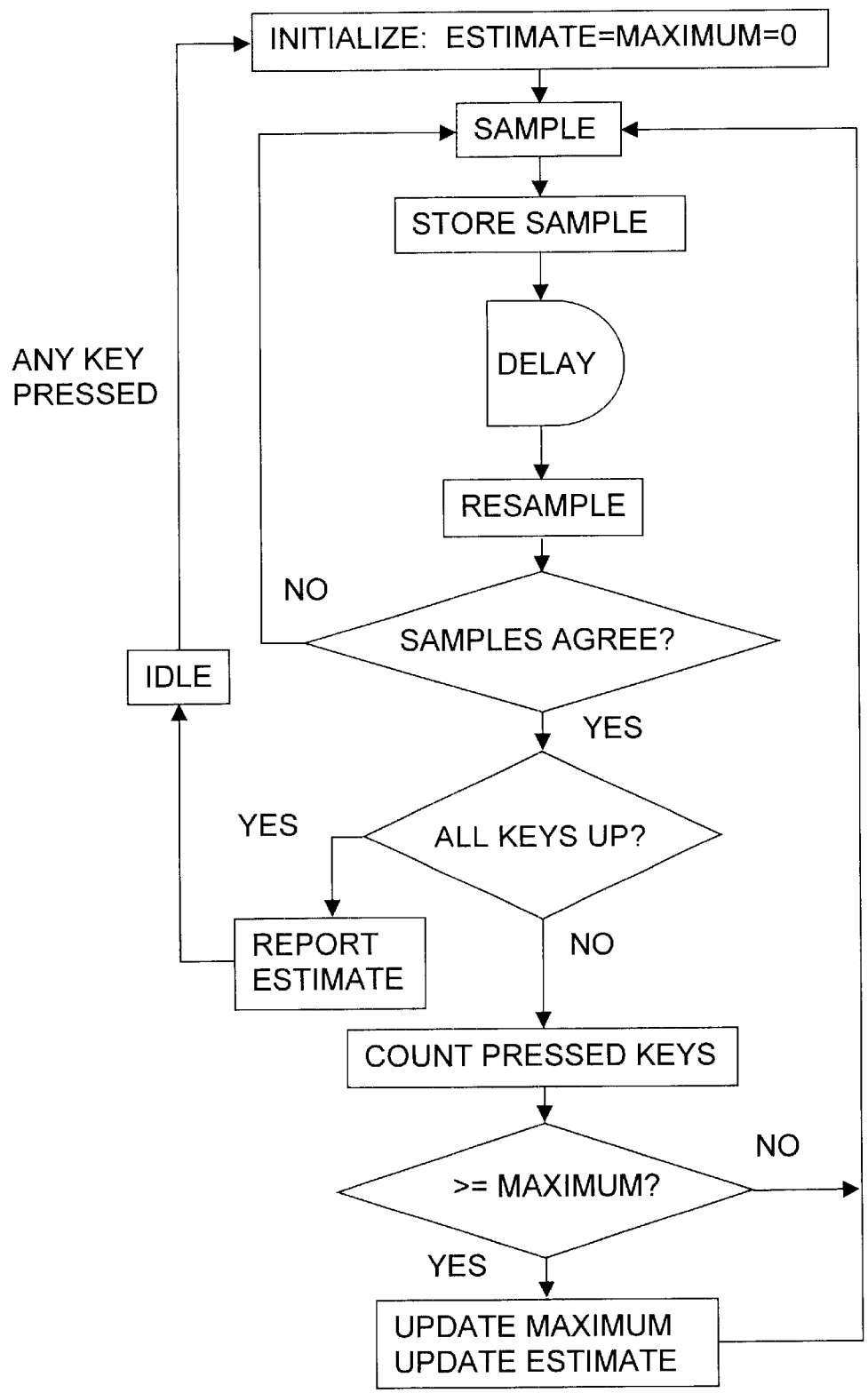
FIG. 20 is a flowchart of an improved chord interpretation method.

FIG. 20 is a flowchart of an implementation of the preferred method of chord interpretation. Since the keys are not all pressed and released at the same instants and the switch contacts will generally bounce, the microprocessor must be programmed to interpret the openings and closings of the switches and to decide which is the intended chord. Suitable decision methods are discussed by Bequaert, et al., (U.S. Pat. No. 4,042,777) and are generally distinguished by their chord observation intervals and decision methods. The decision method preferred for the present invention improves on those of Bequaert, et al. by being more resistant to fumbling. This preferred method begins an observation interval when all keys have been in the released state for at least 10 milliseconds and any key is pressed. The observation interval ends the next time all the keys have returned to the released position for 10 milliseconds. The new decision logic is that, among all chords which persist for at least 10 milliseconds during the observation interval, the intended chord is taken as the last one which has the maximum number of depressed keys among all those persistent chords observed. This improved decision method ignores erroneous initial chords so long as they do not have more depressed keys than does the correct chord and the correct chord is finally entered before all keys are released.

It is understood that the above-described embodiments are merely illustrative of the possible specific embodiments which may represent principles of the present invention. Other arrangements may readily be devised in accordance with these principles by those skilled in the art without departing from the scope of the invention.

APPENDIX

This firmware program for the Atmel AT90S2313 shown in FIG. 13 implements the chord table of FIG. 19 and the chord interpretation method of FIG. 20. It allows the chording keyboard to communicate through the PS/2 keyboard port of a personal computer. The program is in standard Intel hex format ready for download.

```
:10001600002966122443312l2C441B2B2D3A1D1531
:100026001C3323354B4D323B3C342A22421A290DD0
:1000360041494C52545B5D4A161E26252E363D3EDE
:1000460046454E555A0E1114FFFFFFEFFFFFFFFFF7
:10005600FFFFFFFF1258FFFF0506040C030B830A80
:10006600010978077676FF38E06BE0F06BFFFF3921
:10007600E074E0F074FFFF3AE075E0F075FFFF3BD7
:10008600E072E0F072FFFF3CE07DE0F07DFFFF3DB7
:10009600E07AEF07AFFFF3EE070E0F070FFFF3FAD
:1000A600E071E0F071FFFF40E06CE0F06CFFFF41B3
:1000B600E069E0F069FFFF42E012E07CE0F07CE0FE
:1000C600F012FF43E11477E1F014F077FF46E01FEA
:1000D60024F024E0F01FFF47E01FE0F01FFFFF8041
:0600E6005AF05AFFFF0072
:0600000075C08EC0B7C1FF
```

```
:1000EC00479A55270FEF08BB00E601BB08E602BB99
:1000FC00D0E0C0E633270FEC0DBF88988998959A0D
:10010C00969A00E40BBF789453FD2EC106B30F3FB3
:10011C00E9F32AC1222420E8889488988998959A32
:10012C00969A03E003BF01EC02BF02E008BF08B7D8
:10013C0001FDE1CF8299FBCF8499F9CF829BFECF51
:10014C008499D9CF01E003BF0FE502BF02E008BFDD
:10015C0008B701FFFDCF5CD0889416F40894239463
:10016C002795C8F755D000F853D02EF6889A899A5F
:10017C00959896980FE502BF02E008BF08B701FFFB
:10018C00FDCF889807ED02BF02E008BF08B701FF5A
:10019C00FDCF8998959A969A202420FE2CC0253F55
:1001AC0031F400E40BBF33271AEF28D04EC02E3E9B
:1001BC0019F41EEE23D049C0243F21F433271AEF43
:1001CC001DD043C0223F49F400E40BBF13E816D006
:1001DC001BEA14D01AEF12D038C02E3F19F4142D8C
:1001EC000DD033C0243F21F433271AEA07D02DC099
:1001FC001AEF04D02AC01EEF01D027C0339531323C
:10020C0008F030E2CA95C03608F4CFE71883089599
:10021C00889A95980FE502BF02E008BF08B701FF66
:10022C00FDCF8898959A03EC02BF02E008BF08B78F
:10023C0001FFFDCF6894849BE8940BE902BF02E0B8
:10024C0008BF08B701FFFDCF0895F89450FF04C014
:10025C0010EFF5D011E1F3D052FF04C010EFEFD046
:10026C0014E1EDD051FF04C010EFE9D012E1E7D05A
:10027C00587F332309F43FCF488188988998959A01
:10028C00969A222403E003BF01EC02BF02E008BFF0
:10029C0008B701FD30CF829BFBCF849BF9CF899AA5
:1002AC00969801E003BF03EC02BF02E008BF08B759
:1002BC0001FFFDCF889A95980FE502BF02E008BFB9
:1002CC0008B701FFFDCF442E089447951ED04695E4
:1002DC00E9F7089420FC889418D0089416D08898D4
:1002EC008998959A969A5394C395C03808F0C0E6AD
:1002FC003A9501E003BF1E002BF02E008BF08B776
:10030C0001FFFDCF829BFECFA0CF8898959AE894F1
:10031C0001E003BF03EC02BF02E008BF829BFACEF0
:10032C0008B701FFFBCF28F48998969A2394689418
:10033C0002C0899A96980BE902BF02E008BF829B23
:10034C00E9CE16F4849BE6CE08B701FFF8CF889A65
:10035C0095980FE502BF02E008BF16F4849BDACE35
:10036C0008B701FFFACF089553FD04C06624772423
:10037C0088249924FF2736B205E003BF08ED02BF9D
:10038C002E008BF08B701FFFDCF06B3301691F7A6
:10039C00309483943914932C09F08824082D043656
:1003AC0008F05860032D003011F4577F01C053FF34
:1003BC0002C050D00CC088942224000F08F423945F
:1003CC000023D9F7271410F0632C722CD3CFE62D11
:1003DC007696EC3608F01AC0C895002D0F3FB1F098
:1003EC00102D113119F451602AD085CE143119F425
:1003FC00546025D080CE123119F4526020D07BCEBF
:10040C001ED010EF1CD0102D1AD01FCFECE6C895C3
:10041C00002D0F3F11F0E395FACFE395C895002D11
:10042C00003061F0061509F0F2CFE395C895002D68
:10043C000F3F19F0102D03D0F8CF07CF5CCE303220
:10044C0040F4AC2FBD2FA30FA03808F09097339534
:10045C001C93089505E003BF01E002BF02E008BF52
:08046C0008B701FFFDCF089560
:00000001FF
```

I claim:

1. A method for entering input data into an electronic apparatus, comprising the steps of
   (a) providing, for each one of a plurality of keying fingers, a corresponding pair of keyswitches, said fingers and said pairs corresponding one to one, each one of said keyswitches comprising a key part and a momentary-contact, two-state switch part,
   (b) positioning, for each one of said fingers, an inner keyswitch member of the corresponding keyswitch pair on the palm side of the middle phalanx part of said one finger, such that said inner keyswitch can be activated by pressing said side of the middle phalanx part of said one finger against the key part of said inner keyswitch with sufficient, predetermined force,
   (c) positioning, for each one of said fingers, an outer keyswitch member of the corresponding keyswitch pair on the palm side of the distal phalanx part of said one finger such that said outer keyswitch can be activated by pressing said side of the distal phalanx part of said one finger against the key part of said outer keyswitch with sufficient, predetermined force,
   (d) providing means to support the switch parts of said keyswitches in said positions such that said switch parts are not substantially displaced by forces applied by the keying fingers,
   (e) entering a chord by contemporaneously activating a set of said keyswitches so as to define an ordered combination of activated and non-activated keyswitches,
   (f) providing means to convert ordered combinations of activated and non-activated keyswitches to input data,
   (g) providing means to transmit said input data to said apparatus, said apparatus including means to receive and process said input data,
   (h) repeating step (e) until all desired input data have been entered.

2. A one-hand, chording keyboard comprising
   (a) a keyswitch array, said array comprising
      (1) a plurality of keyswitch pairs, said pairs corresponding one to one with an equal plurality of keying fingers on a hand operating said keyboard, each one keyswitch comprising a key part and a momentary-acting, two-state switch part, each one keyswitch pair comprising
         (i) an inner keyswitch positioned on the palm side of the middle phalanx part of a corresponding keying finger, such that said inner keyswitch can be activated by pressing said side of the middle phalanx part of said corresponding keying finger against the key part of said inner keyswitch with sufficient, predetermined force,
         (ii) an outer keyswitch positioned on the palm side of the distal phalanx part of said corresponding keying finger, such that said outer keyswitch can be activated by pressing said side of the distal phalanx part of said corresponding keying finger against the key part of said outer keyswitch with sufficient, predetermined force,
      (2) spacer means to fix the switch parts of said keyswitches in said positions, such that the separations and relative orientations of said switch parts are not substantially changed by forces applied by the keying fingers,
   (b) a frame configured to be gripped between the thumb and the palm of said hand, said frame securely attached to said keyswitch array,
   such that said frame while so gripped supports said keyswitch array against gravity and forces applied by the keying fingers, whereby any combination of said keyswitches can be concurrently activated and released by appropriate small movements of the keying fingers.

3. The keyboard of claim 2 further including means to vary, within a predetermined range, the separation of the member keyswitches of at least one pair, such that said separation can be adjusted to best fit the corresponding operating finger, whereby achieving an improved fit to an individual hand.

4. A keyboard for one-handed typing of chords, said keyboard held in the operating hand, said chords being formed by the simultaneous pressing of one or more keys on the keyboard to produce one or more characters, the keyboard comprising (a) an array of keys for being operated by the fingers of one hand, electrical or optical switch means being connected to the keys in the array of keys, a particular switch combination of closed and open switching paths in the switch means being provided for each chord pressable on the array of keys, (b) means for interpreting chords, comprising (i) means to generate coded signals representing members of a set of characters, (ii) switching and logical circuit means to sense the particular switch combinations of closed and open switching paths of a chord to select character signals that correspond to a respective chord, (iii) output circuit means to issue the character signals, wherein the improvement comprises means to vary, within a predetermined range, the separation of keys which are pressable by any one finger, such that said separation can be adjusted to best fit the size of said one finger, whereby achieving an improved fit to an individual hand.

* * * * *